United States Patent
Mauro

(10) Patent No.: US 6,504,648 B2
(45) Date of Patent: *Jan. 7, 2003

(54) COMPENSATION MECHANISM FOR COMPONENT AND ASSEMBLY DEVIATION IN A COMPONENT PRECISION POSITIONING STAGE

(76) Inventor: George Mauro, 26 Keewaydin Dr., Suite B., Salem, NH (US) 03079

( * ) Notice: Subject to any disclaimer, the term of this patent is extended or adjusted under 35 U.S.C. 154(b) by 0 days.

This patent is subject to a terminal disclaimer.

(21) Appl. No.: 10/076,760

(22) Filed: Feb. 14, 2002

(65) Prior Publication Data

US 2002/0093734 A1 Jul. 18, 2002

Related U.S. Application Data

(63) Continuation-in-part of application No. 09/667,035, filed on Sep. 21, 2000, now Pat. No. 6,266,184, and a continuation-in-part of application No. 09/875,358, filed on Jun. 6, 2001, now Pat. No. 6,373,627.

(51) Int. Cl.[7] .............................................. G02B 21/26
(52) U.S. Cl. ..................... 359/393; 359/391; 359/368
(58) Field of Search .................. 359/391–395, 359/805–809, 811–820, 896; 248/429–430, 468, 474, 480; 312/334.8, 334.13; 389/42, 23, 17; 313/319, 333

(56) References Cited

U.S. PATENT DOCUMENTS

| 3,932,010 | A | 1/1976 | Kenworthy ................. 312/320 |
| 3,960,443 | A | 6/1976 | Goshima et al. ............ 359/391 |
| 4,652,095 | A | 3/1987 | Mauro ........................ 359/391 |
| 4,919,484 | A | 4/1990 | Bougher et al. ............ 297/474 |
| 4,953,988 | A | 9/1990 | Tsukada ........................ 384/8 |
| 5,077,620 | A | 12/1991 | Mauro ........................ 359/393 |
| 5,626,405 | A | 5/1997 | Banks ..................... 312/334.8 |
| 5,676,341 | A | 10/1997 | Tarusawa et al. ........... 248/430 |
| 6,266,184 | B1 | * 7/2001 | Mauro ........................ 359/391 |

* cited by examiner

*Primary Examiner*—Thong Nguyen
(74) *Attorney, Agent, or Firm*—Davis & Bujold, P.L.L.C.

(57) ABSTRACT

A compensation mechanism for correcting component fabrication and assembly deviations in component precision positioning stages utilizing a planar mounting table arranged to slide between two rails consisting of a pair of grooves disposed adjacent one edge of the table and a single groove adjacent an opposite edge of the table, a spring arrangement being provided to provide spring bias between the grooves and the rails.

10 Claims, 5 Drawing Sheets

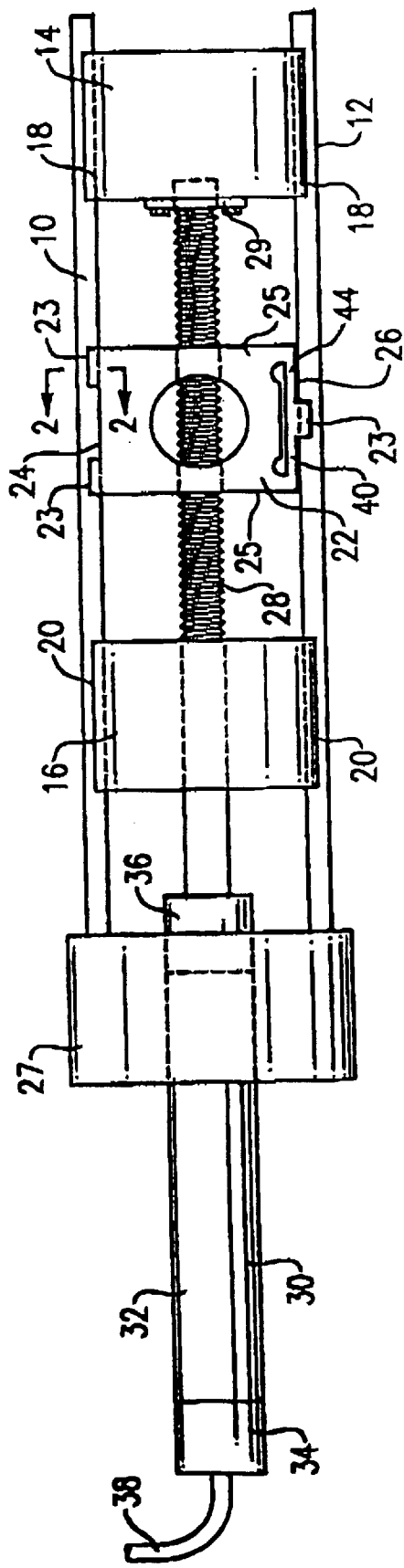
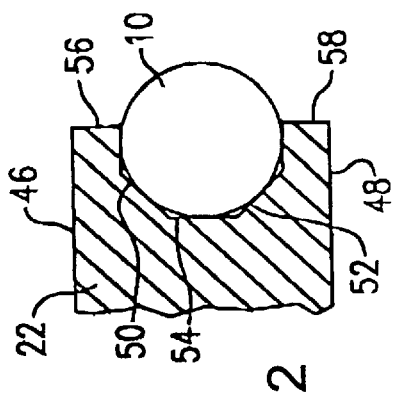
Fig. 1
Fig. 2

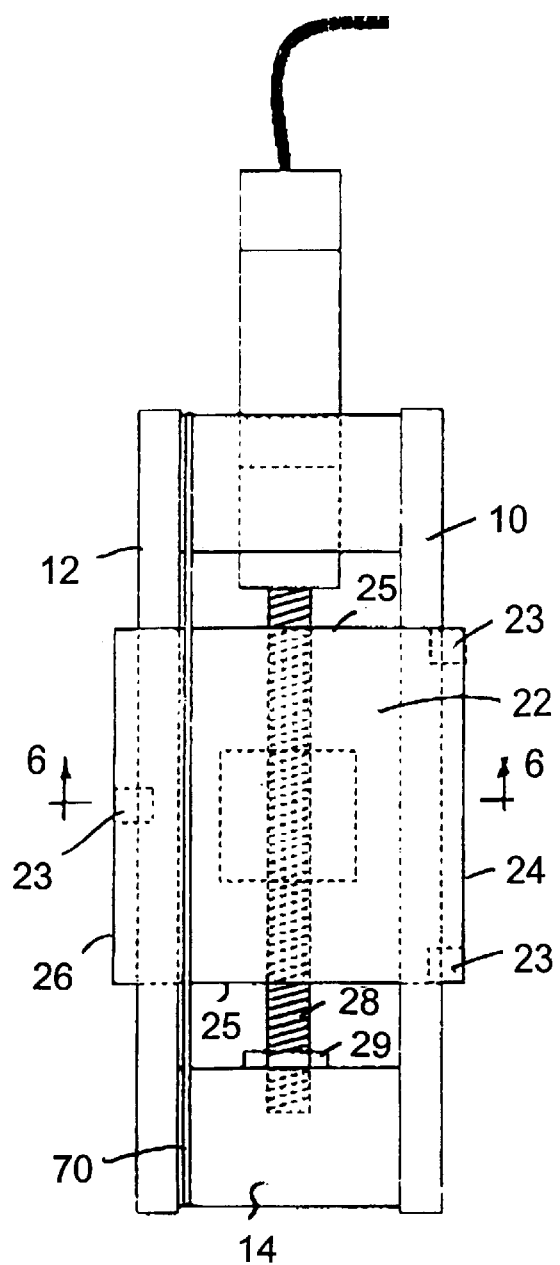
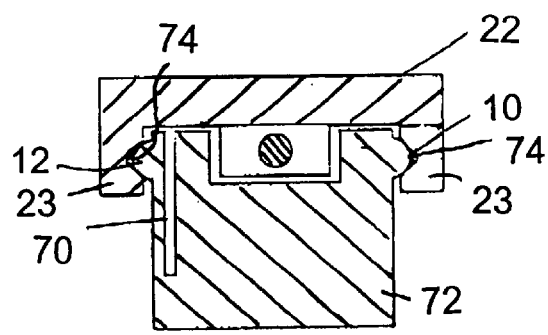
Fig. 5
Fig. 6

COMPENSATION MECHANISM FOR COMPONENT AND ASSEMBLY DEVIATION IN A COMPONENT PRECISION POSITIONING STAGE

RELATED APPLICATION

This is a continuation-in-part application of U.S. patent application Ser. No. 09/667,035 filed Sep. 21, 2000, now U.S. Pat. No. 6,266,184 and U.S. patent application Ser. No. 09/875,358 filed Jun. 6, 2001, now U.S. Pat. No. 6,373,627.

BACKGROUND OF THE INVENTION

1. Field of the Invention

The invention resides in the field of adjustable workpiece mounting stages and more particularly relates to a modification in the mounting table to which the work pieces are attached to compensate for minor deviations in component fabrication and stage assembly.

2. Description of the Prior Art

Precision positioning stages of the type relating to the invention are disclosed in U.S. Pat. Nos. 4,652,095 and 5,077,620 issued to the applicant. In the first of these, the device described employs an adhesive assembly concept for a stage utilizing two end plates having grooves for receiving a pair of parallel smooth cylindrical rails and a mounting table slidably disposed between the plates.

In the second of these, which is an improvement of the first, there is disclosed an electrical motor, gear system, and encoder mounted on an additional plate also disposed between the rails, the motor being operationally connected to the mounting table by a threaded rod such that the table is moved by actuation of the motor.

In the manufacture and construction of these precision devices, great care must be taken in fabricating the component parts and assembling them into a finished unit. Some tolerances must be within one or two ten-thousandths of an inch for both fabrication and assembly in order to achieve a unit which will function properly over a period of time. It has been found that even the most rigorous shop standards will not prevent the limited performance and possible failure of a percentage of units which is greater than desirable. Further, additional units which function well upon delivery will, over a period of time, wear to the point of unacceptable performance. The present invention is intended to alleviate the above mentioned problems in the interaction of the two main components of these stages, i.e. the rails and the mounting table which moves between them. This is accomplished by a modification to the mounting table providing a take-up mechanism to compensate for minor deviations in component fabrication and assembly.

SUMMARY OF THE INVENTION

The invention may be summarized as a compensation or take-up mechanism to reduce the requirement for extreme accuracy in the subject stages, to prevent excessive looseness or tightness in the back and forth motion of the mounting table on the rails, to prevent jogging, i.e. abrupt or non-linear motion of the table and generally to provide a cushioned fit between the table and the rails. The above objectives are achieved by disposing a pair of spaced projections, each having a groove at one edge of the table to engage one of the rails and a single projection, having a groove, intermediate the pair of spaced projections at the opposite edge of the table to engage the other of the rails. The grooves are arranged to be substantially parallel to the upper and lower planar surfaces of the table. An elongate slit parallel to the rails and disposed adjacent to the single projection forms a leaf spring arrangement urging the grooves into engagement with the rails, the table being constructed of metal or plastic chosen to provide the desired spring action.

According to the invention there is provided a pair of straight smooth unthreaded rails secured in spaced apart parallel relationship and slidably supporting a component mounting table slidable mounted to and disposed on said rails, said table being a planar rectangular member having three rails engaging grooves disposed adjacent opposing edges of the table, two aligned said grooves being spaced apart on one of said opposing edges and engaging one of the rails and the other of the grooves being centrally positioned adjacent the other of the opposing edges and engaging the other of the rails and a slot defined by the stage adjacent one of the rails extending parallel to and in close proximity to the last mentioned rail to define a leaf spring biasing the rails into resiliently engagement with the grooves.

Preferably the table has a central threaded bore positioned to engage a threaded rod adapted to be driven by a stage drive means, the three grooved projections form a triangle of rail engaging locations on the table with said two grooved projections disposed at one opposing edge of the table and the slot extends to closely adjacent the opposed ends of the table.

Also according the invention there is provided a precision component positioning stage comprising:

a) first and second smooth straight unthreaded rails supported in spaced apart parallel relationship;

b) a component mounting table defining first and second grooves spaced along and engaging said first rail and defining a third groove intermediate of the first and second grooves and engaging said second rail; and c) a cantilever spring defined by a rail support to bias said rails into engagement with said grooves whereby deviations from a true linear path are prevented by said bias.

Also according to the invention there is provided a pair of straight smooth unthreaded grooves secured in spaced apart parallel relationship and slidably supporting a component mounting table slidable mounted to and disposed on said grooves, said table being a planar member having three groove engaging short rails disposed adjacent opposing edges of the table, two aligned said short rails being spaced apart on one of said opposing edges and engaging one of the grooves and the other of the short rails being centrally positioned adjacent the other of the opposed edges and engaging the other of the grooves, the stage also having a slot adjacent one of the grooves extending parallel to and in close proximity to the last mentioned groove to define a leaf spring supporting said that groove and extending the length of the slot to bias the grooves into resilient engagement with the rails.

BRIEF DESCRIPTION OF THE DRAWINGS

The invention will now be described, by way of example, with reference to the accompanying drawings, in which:

FIG. 1 is a plan view of a positioning stage incorporating the first embodiment of the invention;

FIG. 2 is a cross-section of one of the rail engaging grooves of the table 22 of FIG. 1 taken on section line 2—2 of FIG. 1;

FIG. 5 is a plan view of a positioning stage incorporating a third embodiments of the invention;

FIG. 6 is a cross-section of the rail engaging table of FIG. 5 taken on section line 6—6 of FIG. 5;

DESCRIPTION OF THE PREFERRED EMBODIMENTS

Figure 3:
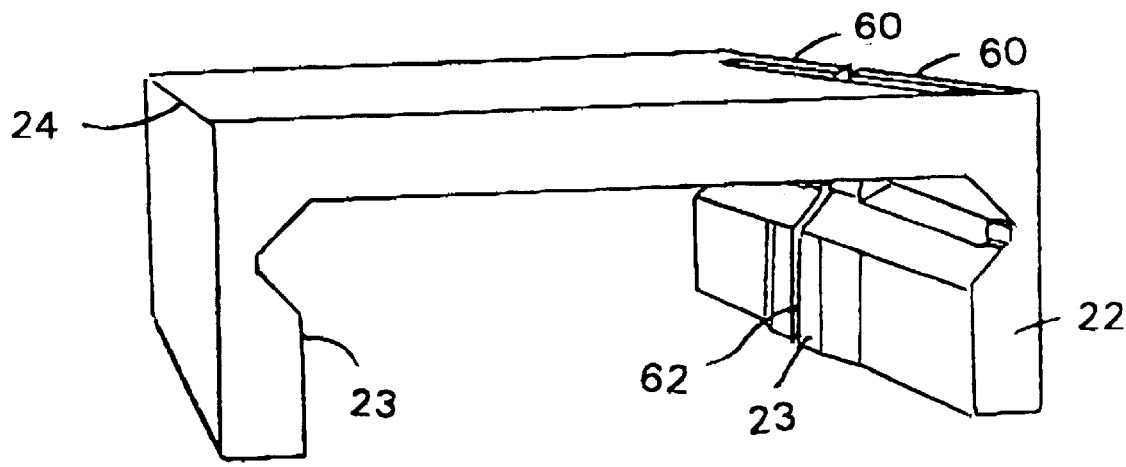
FIG. 3 is a perspective view of a second embodiment of a table of a positioning stage shown in FIG. 1.

FIG. 1 illustrates the preferred embodiment of the invention as utilized in a precision positioning stage employing an electric motor for moving the mounting table. Smooth cylindrical parallel rails 10, 12 are spaced apart by and adhesively attached to end plates 14, 16 in grooves 18, 20, respectively. Component mounting table 22 having three projections 23, each defining a rail receiving groove, is slidably disposed between rails 10, 12. The projections 23 consist of two projections spaced apart on one longitudinal edge 24 of the table to engage rail 10 adjacent opposite ends 25 of the table, and a single projection located centrally on the opposite longitudinal edge 26 of the table to engage rail 12 centrally intermediate the ends 25. A fixed motor assembly mounting plate 27 is attached to rails 10, 12. Partially threaded rod 28 extends through end plate 16, is threadably engaged with mounting table 22 and is rotationally connected to end plate 14 by clamp 29.

Motor assembly 30, consisting of electric motor 32, motor revolution sensing encoder 34, and speed reduction gear train 36, is mounted on plate 27. Rotation of the motor, electrically energized through cable 38, rotates rod 28 and moves table 22 back and forth between end plates 14, 16 along the rails 10, 12.

As the scale of the above described device is extremely small, the table being approximately one-half inch square and 0.2 inches thick with the extent of mounting table travel being in the vicinity of one to two inches, it will be seen that the tolerance of component fabrication and assembly is quite critical for smooth and accurate operation. Disposition of slit 40, approximately 0.008 inch wide, extending through the table 22 in close proximity to longitudinal edge 26 provides a measure of compensation for manufacturing inaccuracies which has been found to greatly increase the acceptability of finished units as compared to stages without the present invention. This slit 40 extends parallel to rail 12 for a substantial portion of the length of the table 22 between ends 25 thereby to form a leaf spring 44 parallel to rail 12 and edge 26, arranged to urge the grooves into engagement with the respective rails 10, 12 with a force of about one pound. The slit may be machined by EDM and EDM wire threading openings may be provided at the ends of the slit, as illustrated.

FIG. 2 provides an enlarged view of the groove of one of the projections 23, all three of which are identical in cross-section. In particular FIG. 2 illustrates the positioning of the grooves between upper and lower surfaces 46, 48 of table 22. Each groove comprises two rail engaging faces 50, 52 disposed at 45° to the surfaces 46, 48 and spaced by a vertical surface 54 spaced from the rail engaging surfaces 50, 52.

Surfaces 56, 58, perpendicular to surfaces 46, 48, extend over the associated rail in spaced relationship thereto to ensure retention of the table 22 on the rails 10, 12.

It has been found that this invention's use of three grooved projections in the arrangement described provides compensation of the table on the rails equal to that of prior art designs while the spring bias action is greatly facilitated by the slit design also described.

Figure 4:
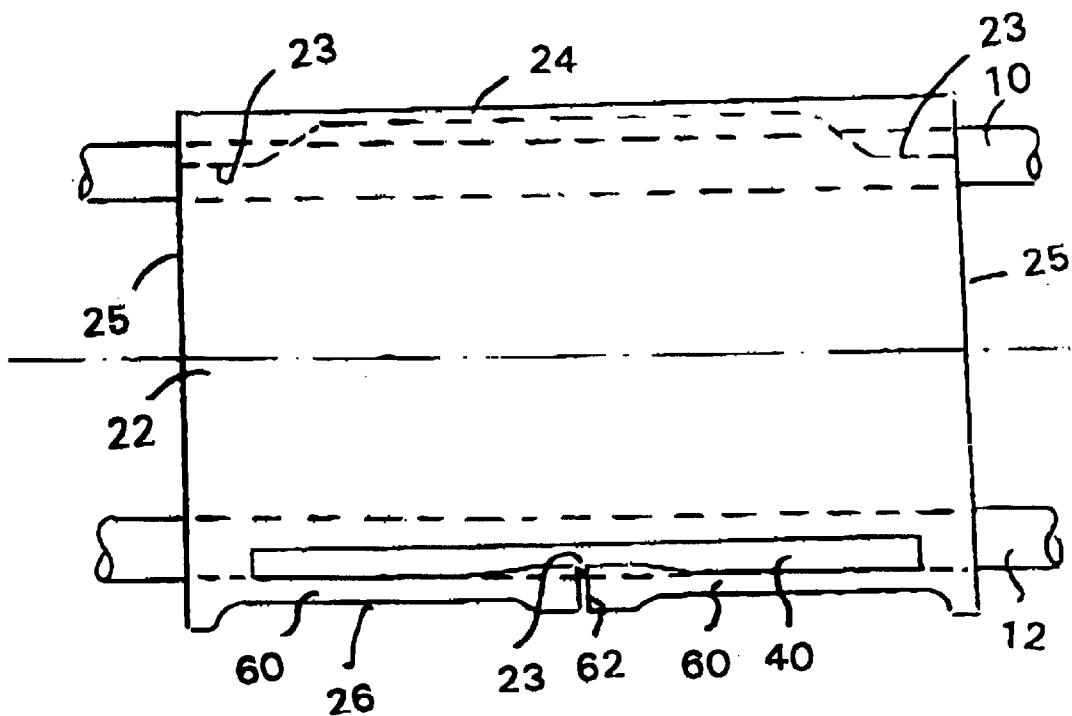
FIG. 4 is a plan view of a portion of the positioning stage of the present invention with the table shown in FIG. 3.

FIGS. 3 and 4 illustrate a second embodiment in which the table 22 fits over the rails 10, 12 instead of between them. Except as now described, the features of the second embodiment are similar to the first embodiment and will not again be described here.

The component mounting table 22, has three inwardly facing projections 23, formed on downwardly extending side parts of the table, each defining a rail receiving groove, is slidably mounted on the rails 10, 12. The projections 23 consist of two projections spaced apart adjacent one longitudinal edge 24 of the table to engage rail 10 adjacent opposite ends 25 of the table, and a single split projection located centrally on the opposite longitudinal edge 26 of the table to engage rail 12 centrally intermediate the ends 25. A partially threaded rod 28 (not shown in FIGS. 3 and 4) is threadably engaged with mounting table 22 and is rotationally connected to plate 14 by a clamp 29 (see FIG. 1).

A slot 40, closed at both ends and approximately 0.008 inch wide, extends through the table 22, is disposed in close proximity to the longitudinal edge 26 to provide a measure of compensation for manufacturing inaccuracies and has been found to greatly increase the acceptability of finished units as compared to stages without the present invention. This slot 40 is centered on the single projection and extends parallel to rail 12 for a substantial portion of the length of the table 22 between ends 25 thereby to form a pair of cantilever springs 60 parallel to rail 12 and edge 26 and separated by a vertical slot 62 centrally disposed in the adjacent projection 23. The leaf springs are arranged to urge the grooves into engagement with the respective rails 10, 12 with a force of about one pound.

The second embodiment allows a wider disposition of the table support points on the rails and an increase in the table length (up to twice that length of the table of the first embodiment). Assembly of the stage is also simplified.

FIGS. 5 and 6 illustrate a third embodiment in which the table 22 fits over the rails 10, 12 instead of between them. Except as now described, the features of the first and second embodiments are similar to the third embodiment and will not again be described here.

The component mounting table 22 has three inwardly facing projections 23, formed on downwardly extending side parts of the table, each defining a rail receiving groove slidably mounted on the rails 10, 12. The projections 23 consist of two projections spaced apart adjacent one longitudinal edge 24 of the table to engage rail 10 adjacent opposite ends 25 of the table, and a single projection 23 located centrally on the opposite longitudinal edge 26 of the table to engage rail 12 centrally intermediate the ends 25. A partially threaded rod 28 is threadably engaged with mounting table 22 and is rotationally connected to plate 14 by a clamp 29.

A slot 70 extends along the full length of rail 12 and is disposed in a rail support 72 supporting and spacing rails 10 and 12 to provide a longitudinal leaf spring to provide outward resilient engagement of the rails 10, 12 with the grooves 74 of the table 22. This provides a measure of compensation for manufacturing inaccuracies and has been found to greatly increase the acceptability of finished units as compared to stages without the present invention. The leaf spring is arranged to urge the rails 10, 12 into engagement with the grooves 74 with a force of about one pound.

The third embodiment allows a wider disposition of the table support points on the rails and an increase in the table length (up to twice that length of the table of the first embodiment). Assembly of the stage is also simplified.

Figure 7:
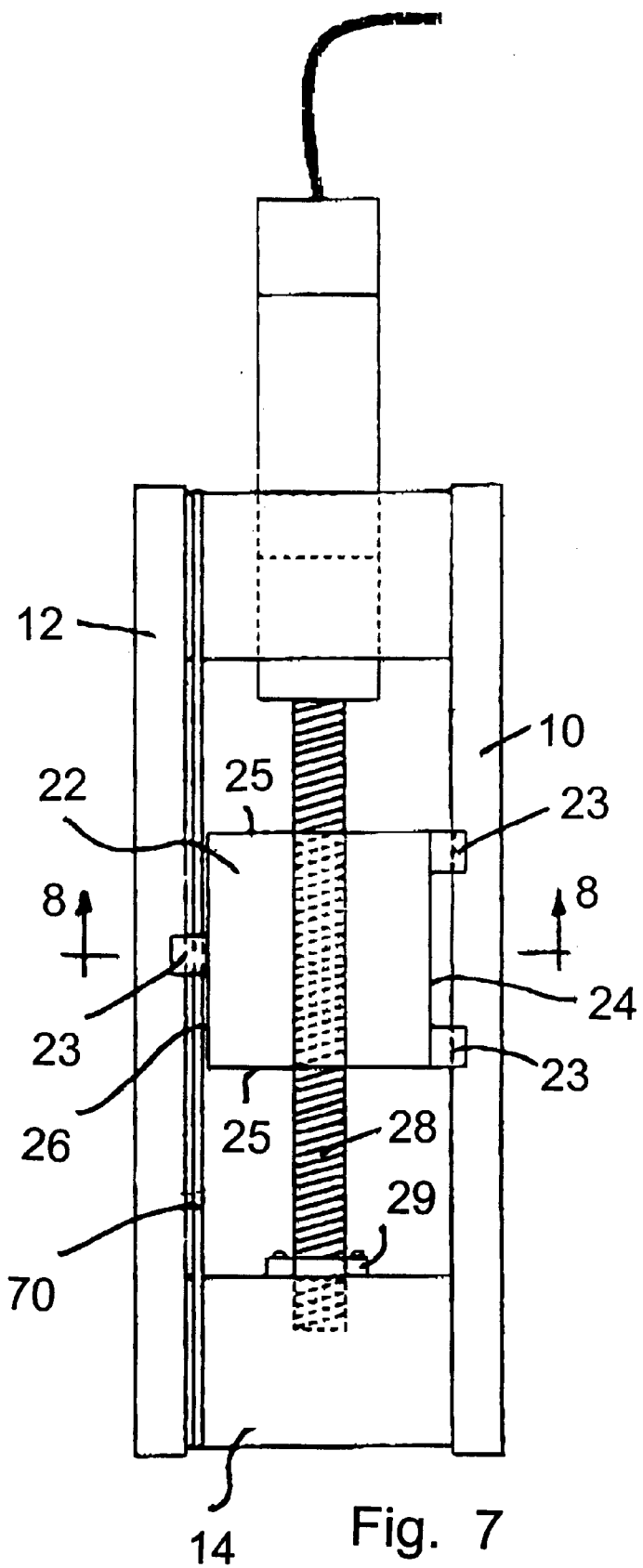
FIG. 7 is a plan view of a position stage incorporating a fourth embodiment of the invention.
Figure 8:
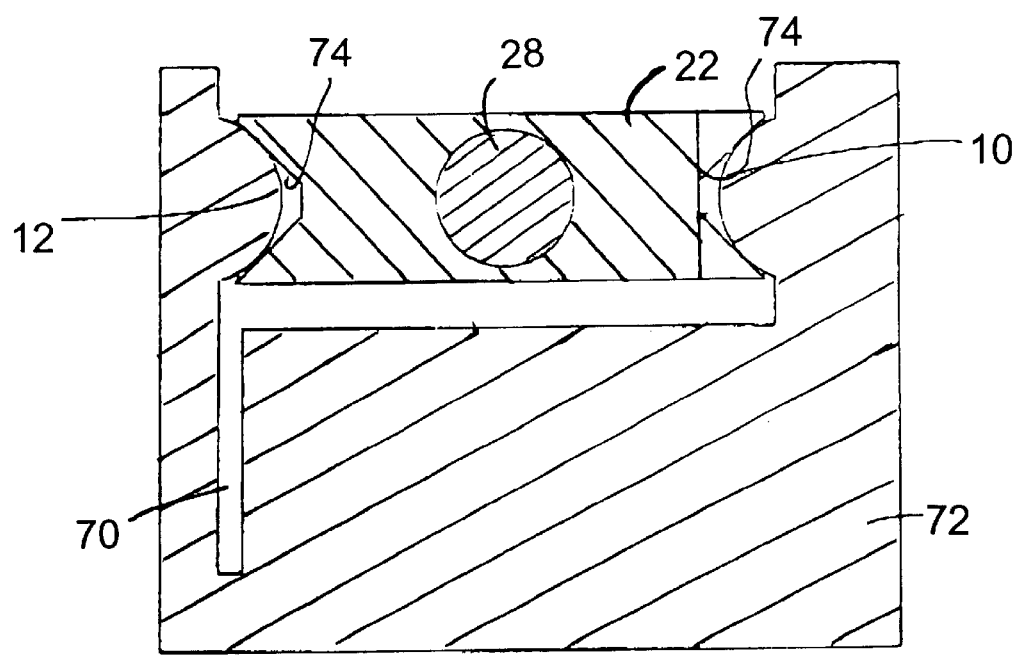
FIG. 8 is a cross-section of the rail engaging table of FIG. 7 taken on section line 7—7 of FIG. 7.

FIGS. 7 and 8 illustrate a fourth embodiment in which the table 22 fits between the rails 10, 12 instead of over them. Except as now described, the features of the first three embodiments are similar to the fourth embodiment and will not again be described here.

The component mounting table 22 has three outwardly facing projections 23, formed on sides of the table, each defining a rail receiving groove slidably mounted on the rails 10, 12. The projections 23 consist of two projections spaced apart adjacent one longitudinal edge 24 of the table to engage rail 10 adjacent opposite ends 25 of the table, and a single projection 23 located centrally on the opposite longitudinal edge 26 of the table to engage rail 12 centrally intermediate the ends 25. A partially threaded rod 28 is threadably engaged with mounting table 22 and is rotationally connected to plate 14 by a clamp 29 or preloaded into an end bearing using a journal.

A slot 70 extends along the full length of rail 12 and is disposed in a rail support 72 supporting and spacing rails 10 and 12 to provide a longitudinal leaf spring to provide inward resilient engagement of the rails 10, 12 with the grooves 74 of the table 22. This provides a measure of compensation for manufacturing inaccuracies and has been found to greatly increase the acceptability of finished units as compared to stages without the present invention. The leaf spring is arranged to urge the rails 10, 12 into engagement with the grooves 74 with a force of about one pound.

It will be appreciated that in the third and the fourth embodiment the leaf spring 70 could be placed adjacent to support rail 10 and that four projections 23 disposed as opposed pairs at each end 25 of table 22 could be used.

Figure 9:
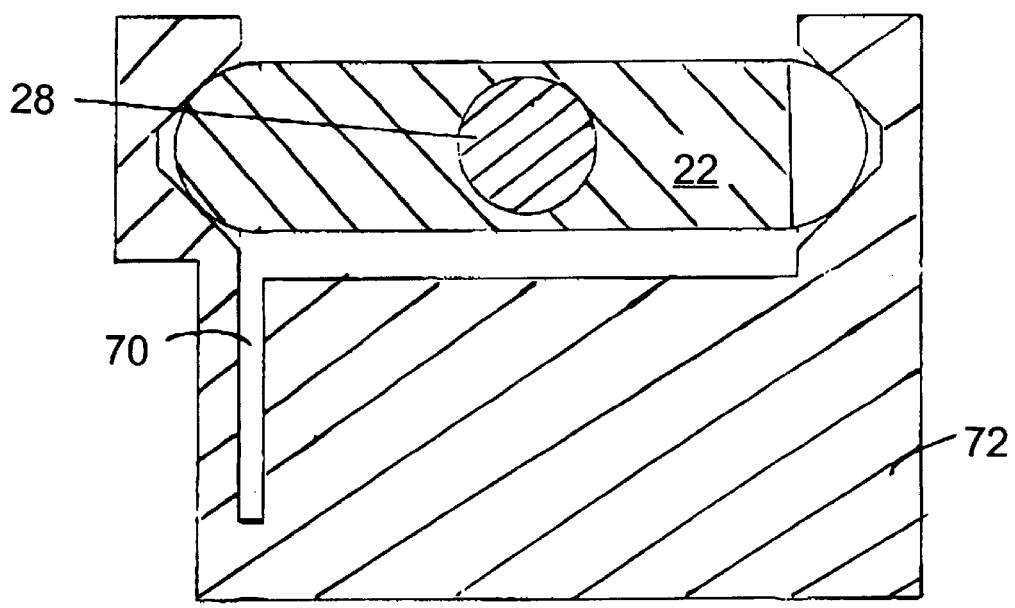
FIG. 9 is a cross-section, similar to that of FIG. 8, of a further embodiment of table in which grooves are substituted for rails and short rails are substituted for grooves.

It will also be appreciated that in all embodiments the rails may be curved to provide for partial table rotation (or other curved shapes, such as parabolic, etc.) As in a goniometer or as a roller coaster type motion. Also multiple tables could be supported on a common pair of rails, the grooves and rails could be reversed (e.g. FIG. 9) with the grooves replacing the rails and short rails replacing the table grooves.

What is claimed is:

1. A component precision positioning stage, comprising a pair of straight smooth unthreaded rails secured in spaced apart parallel relationship and slidably supporting a component mounting table slidable mounted to and disposed on said rails, said table being a planar rectangular member having three rails engaging grooves disposed adjacent opposing edges of the table, two aligned said grooves being spaced apart on one of said opposing edges and engaging one of the rails and the other of the grooves being centrally positioned adjacent the other of the opposing edges and engaging the other of the rails and a slot defined by the stage adjacent one of the rails extending parallel to and in close proximity to the last mentioned rail to define a leaf spring biasing the rails into resiliently engagement with the grooves.

2. The stage of claim 1 wherein said table has a central threaded bore positioned to engage a threaded rod adapted to be driven by a stage drive means.

3. The stage of claim 1 wherein the three grooves form a triangle of rail engaging locations on the table with said two grooved projections disposed adjacent one opposing edge of the table.

4. The stage of claim 1, wherein the slot is closed at both ends, is defined by the table and defines two leaf springs in the form of cantilever springs formed by an opening centered on the last mentioned groove.

5. The stage of claim 1, wherein the slot is defined by and extends the length of a support for said rails to define the leaf spring.

6. A precision component positioning stage comprising:
   a) first and second smooth straight unthreaded rails supported in spaced apart parallel relationship;
   b) a component mounting table defining first and second grooves spaced along and engaging said first rail and defining a third groove intermediate of the first and second grooves and engaging said second rail; and
   c) a cantilever spring defined by a rail support to bias said rails into engagement with said grooves whereby deviations from a true linear path are prevented by said bias.

7. The stage of claim 6 comprising means for moving the table along the rails.

8. A component precision positioning stage, comprising a pair of straight smooth unthreaded grooves secured in spaced apart parallel relationship and slidably supporting a component mounting table slidable mounted to and disposed on said grooves, said table being a planar member having three groove engaging short rails disposed adjacent opposing edges of the table, two aligned said short rails being spaced apart on one of said opposing edges and engaging one of the grooves and the other of the short rails being centrally positioned adjacent the other of the opposed edges and engaging the other of the grooves, the stage also having a slot adjacent one of the grooves extending parallel to and in close proximity to the last mentioned groove to define a leaf spring supporting said that groove and extending the length of the slot to bias the grooves into resilient engagement with the rails.

9. The stage of claim 8 comprising means for moving the table along the rails.

10. The stage of claim 8, wherein the slot is defined by and extends the length of a support for said grooves to define the leaf spring.

* * * * *